United States Patent
Chishima

(10) Patent No.: US 7,936,545 B2
(45) Date of Patent: *May 3, 2011

(54) POWER SUPPLY CONTROL SYSTEM

(75) Inventor: Yuki Chishima, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/822,708

(22) Filed: Jun. 24, 2010

(65) Prior Publication Data

US 2010/0254054 A1  Oct. 7, 2010

Related U.S. Application Data

(63) Continuation of application No. 12/188,348, filed on Aug. 8, 2008, now Pat. No. 7,764,478.

(30) Foreign Application Priority Data

Aug. 10, 2007  (JP) ................. 2007-210298

(51) Int. Cl.
*H02H 5/00* (2006.01)
(52) U.S. Cl. ....... 361/63; 361/93.1; 361/93.2; 361/93.7; 361/93.9
(58) Field of Classification Search .......... None
See application file for complete search history.

(56) References Cited

U.S. PATENT DOCUMENTS

| 5,305,174 | A  | * | 4/1994  | Morita et al. ............... 361/63 |
| 5,689,395 | A  | * | 11/1997 | Duffy et al. ................ 361/93.6 |
| 6,052,268 | A  | * | 4/2000  | Thomas ..................... 361/103 |
| 6,646,842 | B2 | * | 11/2003 | Pan et al. ................... 361/58 |
| 7,215,524 | B2 | * | 5/2007  | Yan ........................... 361/93.9 |
| 7,764,478 | B2 | * | 7/2010  | Chishima ................... 361/63 |
| 2002/0118968 | A1 | * | 8/2002 | Takahashi ................. 396/277 |
| 2009/0040058 | A1 | * | 2/2009 | Sato ........................ 340/636.1 |
| 2010/0103306 | A1 | * | 4/2010 | Ueda et al. .............. 348/333.12 |

FOREIGN PATENT DOCUMENTS

JP  402069727  * 9/1998

* cited by examiner

*Primary Examiner* — Stephen W Jackson
*Assistant Examiner* — Terrence R Willoughby
(74) *Attorney, Agent, or Firm* — Cowan, Liebowitz & Latman, P.C.

(57) ABSTRACT

A power supply control system having a first switch circuit configured to set a power supply line which connects a power supply unit and a power supply circuit to one of a connected state and a non-connected state, a first control unit configured to operate in one of a normal mode and a sleep mode in which a consumption current is smaller than in the normal mode, and to detect a magnitude of a current flowing into the first switch circuit and control an operation of the first switch circuit based on the detected magnitude of the current while operating in the normal mode, and a second control unit configured to control an operation of the first control unit based on the detection result of an opening-closing state detection unit configured to detect an opening-closing state of a battery lid provided to the power supply unit.

8 Claims, 3 Drawing Sheets

POWER SUPPLY CONTROL SYSTEM

CROSS-REFERENCE TO RELATED APPLICATIONS

This application is a continuation of application Ser. No. 12/188,348, filed Aug. 8, 2008 now U.S. Pat. No. 7,764,478 the entire disclosure of which is hereby incorporated by reference.

BACKGROUND OF THE INVENTION

1. Field of the Invention

The present invention relates to a power supply control system which controls a power supply voltage supplied from a power supply unit to a load circuit.

2. Description of the Related Art

In recent years, a digital camera and digital video camera are becoming prevalent as image capture apparatuses. These cameras form an image of light from an object on an image capture element via an optical lens, thereby capturing and recording a digital image of the object. Such image capture apparatuses include a power supply control system which controls power supply voltages supplied to load circuits such as a circuit for driving the optical lens and that for operating the image capture element (see Japanese Patent Laid-Open No. 7-288930).

Japanese Patent Laid-Open No. 7-288930 discloses a power supply control system in which a fuse is inserted in a power supply line which supplies power supply voltages (DC voltages) from a power supply circuit (DC-DC converter) to a plurality of load circuits. When an overcurrent flows into the power supply line as the load circuit, DC-DC converter, or the like short-circuits, such a power supply control system disconnects the power supply line by the fuse so that the supply of a power supply voltage to the short-circuited device can be stopped without any influence such as voltage fluctuation on the other load circuits.

A power supply control system as shown in FIG. 3 has also been known. FIG. 3 is a schematic block diagram showing the configuration of a conventional power supply control system 1000. In FIG. 3, a power supply unit 1010 includes a battery, and a power supply circuit 1020 includes a DC-DC converter. DC voltages output from the power supply circuit 1020 are applied to load circuits 1070, 1080, and 1090 as DC power supply voltages for operating them. A current detection resistance 1040 and current limiting resistance 1050 are connected in series with each other between the power supply unit 1010 and the power supply circuit 1020.

The two ends of the current detection resistance 1040 are connected to a current determination circuit 1032 included in a control unit 1030. The control unit 1030 includes a control circuit 1034 which receives the output from the current determination circuit 1032. The operating power supply voltage of the control unit 1030 is directly supplied from the power supply unit 1010. A shutoff switch (SW) circuit 1060 is connected in parallel with a current limiting resistance 1050. The shutoff switch circuit 1060 is controlled in accordance with a control signal from the control circuit 1034. The control signal from the control circuit 1034 is also supplied to the power supply circuit 1020, and used to control the power supply circuit 1020 to an operative state.

However, the power supply control system requires a large consumption current in operation, so the consumption current of the power supply control system is preferably minimized when the image capture apparatus is not used.

A general image capture apparatus has a battery lid to prevent detachment of a battery serving as a power supply. Even while the battery lid is open, a power supply voltage is often supplied to the image capture apparatus as long as the battery is attached to the image capture apparatus. In this case, the power supply control system is in a sleep state while the battery lid is open. However, because an abnormal current cannot be monitored while the power supply control system is in a sleep state, a fuse must be inserted in the power supply line. Once the fuse blows out, it must be replaced with a new one. It is difficult and inconvenient to replace a fuse in a compact apparatus such as an image capture apparatus. However, when the power supply control system is always kept in a normal state, it wastefully consumes the power of the battery.

SUMMARY OF THE INVENTION

The present invention to provides an electronic apparatus which enables an abnormal current check even while a battery lid is open without using any fuse, and suppresses the consumption of a power supply by a power supply control system itself.

According to one aspect of the present invention, there is provided A power supply control system comprises: a power supply circuit configured to supply a DC voltage output from a power supply unit which detachably holds a battery to a load circuit; a first switch circuit configured to set a power supply line which connects the power supply unit and the power supply circuit to one of a connected state and a non-connected state; a first control unit configured to operate in one of a normal mode and a sleep mode in which a consumption current is smaller than in the normal mode, and to detect a magnitude of a current flowing into the first switch circuit and control an operation of the first switch circuit based on the detected magnitude of the current while operating in the normal mode; an opening-closing state detection unit configured to detect an opening-closing state of a battery lid provided to the power supply unit; and a second control unit configured to control an operation of the first control unit based on the detection result obtained by the opening-closing state detection unit, wherein if the opening-closing state detection unit detects that the opening-closing state of the battery lid is an opening state, the second control unit operates the first control unit in the normal mode to detect the magnitude of the current flowing into the first switch circuit.

Further features of the present invention will become apparent from the following description of exemplary embodiments with reference to the attached drawings.

DESCRIPTION OF THE EMBODIMENT

A preferred embodiment of the present invention will be described below with reference to the accompanying drawings.

Figure 1:
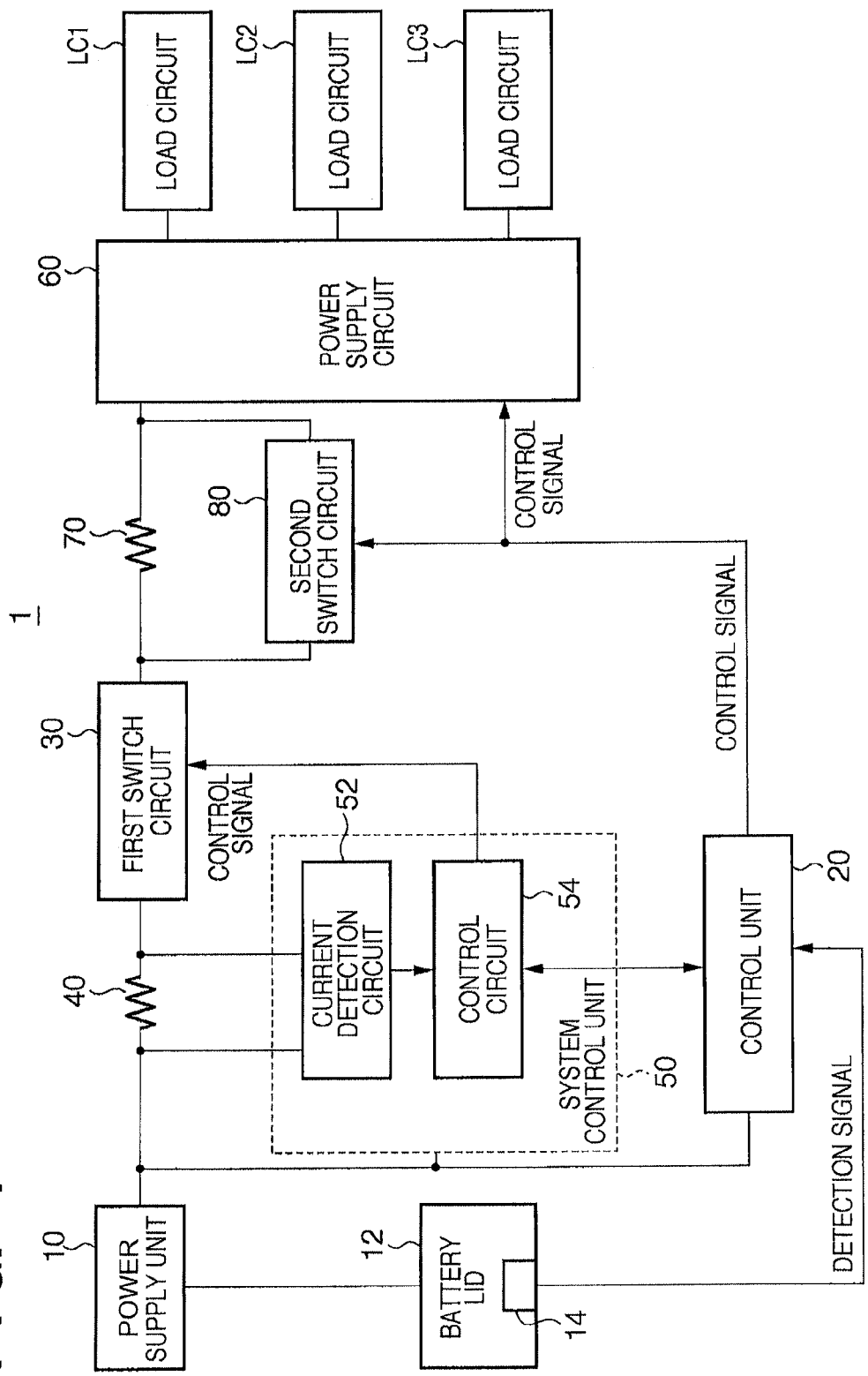
FIG. 1 is a schematic block diagram showing a power supply control system according to one aspect of the present invention.

FIG. 1 is a schematic block diagram showing a power supply control system 1 according to one aspect of the present invention. The power supply control system 1 controls power supply voltages supplied to a plurality of load circuits $LC_1$, $LC_2$, and $LC_3$, and is suitable for image capture apparatuses such as a digital camera. The plurality of load circuits $LC_1$, $LC_2$, and $LC_3$ include, for example, a circuit for driving an optical lens, that for driving an electronic flash, and that for operating an image capture element. However, the power supply control system 1 is applicable not only to image capture apparatuses but also to various electronic apparatuses.

As shown in FIG. 1, the power supply control system 1 includes a power supply unit 10, battery lid 12, control unit 20, first switch circuit 30, current detection resistance 40, system control unit 50, power supply circuit 60, current limiting resistance 70, and second switch circuit 80.

The power supply unit 10 detachably holds a battery (commonly-used battery, dedicated battery, or battery holder), and outputs a DC voltage.

The battery lid 12 is provided to the power supply unit 10, and prevents the battery attached to the power supply unit 10 from jumping out of the power supply unit 10. The battery lid 12 includes an opening-closing state detection unit 14 which detects its opening-closing state. The opening-closing state detection unit 14 includes a detection switch and circuit for detecting the opening-closing state of the battery lid 12, and outputs a detection signal representing the opening-closing state of the battery lid 12 to the control unit (second control unit) 20.

The control unit 20 controls the operation of the system control unit 50 based on the detection result (detection signal) obtained by the opening-closing state detection unit 14. The control unit 20 includes a timer circuit which measures the time elapsed since the battery lid 12 opens (predetermined time). The control unit 20 also controls the operations of the second switch circuit 80 and power supply circuit 60 based on the detection result (the magnitude of a current flowing into the first switch circuit 30) which is obtained by a current detection circuit 52 and input from the system control unit 50 (control circuit 54). The detailed control of units by the control unit 20 will be described in detail later.

The first switch circuit 30 has a function of setting a power supply line which connects the power supply unit 10 and the power supply circuit 60 to a connected state or non-connected state. One terminal of the first switch circuit 30 is connected to the terminal of the power supply unit 10, which outputs a DC voltage supplied from it, via the current detection resistance 40. The other terminal of the first switch circuit 30 is connected to the power supply circuit 60 via the current limiting resistance 70. The first switch circuit 30 may be connected between the power supply circuit 60 and a parallel circuit of the current limiting resistance 70 and second switch circuit 80.

The current detection resistance 40 is provided to detect the magnitude of the current flowing into the first switch circuit 30. Because the current detection resistance 40 is basically inserted immediately after the power supply unit 10, it can monitor (detect) the current magnitude (current value) of the overall system.

The system control unit (first control unit) 50 operates in a normal mode or a sleep mode in which the consumption current is smaller than in the normal mode, and controls the operation of the first switch circuit 30 based on the magnitude of the current flowing into the first switch circuit 30. The operating power supply voltage of the system control unit 50 is supplied from the middle point of the connection path between the power supply unit 10 and the terminal of the current detection resistance 40. In this embodiment, the system control unit 50 includes the current detection circuit 52 and control circuit 54.

The current detection circuit 52 detects the magnitude of the current flowing into the first switch circuit 30, and is connected to the two ends of the current detection resistance 40. More specifically, the current detection circuit 52 monitors (detects) the voltage across the two ends of the current detection resistance 40, and calculates the magnitude (current value) of the current flowing into the first switch circuit 30. If the magnitude of the current flowing into the first switch circuit 30 is equal to or larger than a predetermined threshold (i.e., an abnormal current is flowing through the power supply control system 1), the current detection circuit 52 outputs to the control circuit 54 an abnormal current detection signal representing that an abnormal current is detected.

The control circuit 54 ON/OFF-controls the first switch circuit 30 based on the detection result obtained by the current detection circuit 52. More specifically, if the magnitude of the current flowing into the first switch circuit 30 is equal to or larger than the threshold (if the control circuit 54 receives the abnormal current detection signal), the control circuit 54 turns off the first switch circuit 30 to set the power supply line which connects the power supply unit 10 and the power supply circuit 60 to a non-connected state. If the magnitude of the current flowing into the first switch circuit 30 is smaller than the threshold (i.e., the control circuit 54 receives no abnormal current detection signal), the control circuit 54 turns on the first switch circuit 30 to set the power supply line which connects the power supply unit 10 and the power supply circuit 60 to a connected state.

The power supply circuit 60 includes, for example, a DC-DC converter, and supplies, to the plurality of load circuits $LC_1$, $LC_2$, and $LC_3$, DC voltages serving as their required operating power supply voltages according to their specifications.

The current limiting resistance 70 is connected between the first switch circuit 30 and the power supply circuit 60, and has a function of limiting a DC voltage supplied to the power supply circuit 60. The current limiting resistance 70 has a function of ensuring the operating voltages of the control unit 20 and system control unit 50 (current detection circuit 52 and control circuit 54) when one of the power supply circuit 60 and load circuits $LC_1$, $LC_2$, and $LC_3$ short-circuits.

The second switch circuit 80 is connected in parallel with the current limiting resistance 70, and inserted in the power supply line which connects the first switch circuit 30 and the power supply circuit 60. The second switch circuit 80 supplies a DC voltage to the power supply circuit 60 by bypassing the current limiting resistance 70 in an ON state. The second switch circuit 80 is OFF when a battery is attached to the power supply unit 10. Therefore, a DC voltage from the power supply unit 10 is limited and supplied to the power supply circuit 60 via the current limiting resistance 70 until (a control signal from) the control unit 20 turns on the second switch circuit 80.

The power supply control system 1 is formed by connecting the current detection resistance 40, first switch circuit 30, and current limiting resistance 70 in series with each other in this order from the power supply unit 10 to the power supply circuit 60. The second switch circuit 80 is connected in parallel with the current limiting resistance 70. Although each of the first switch circuit 30 and second switch circuit 80 includes a switch which uses a semiconductor element such as an FET element in this embodiment, it may include a switch element which uses a mechanical solenoid.

In the power supply control system 1, the first switch circuit 30 is inserted immediately after the current detection resistance 40, in order to shut off the overall system. The first switch circuit 30 and second switch circuit 80 are OFF while a battery is not attached to the power supply unit 10.

When a battery is attached to the power supply unit 10, that is, a DC voltage is supplied from the power supply unit 10, (a control signal from) a control unit (not shown) turns on the first switch circuit 30. The control unit 20 is also operated to set the system control unit 50 in the normal mode or sleep mode in accordance with a detection signal representing the opening-closing state of the battery lid 12 from the opening-closing state detection unit 14. More specifically, if the opening-closing state detection unit 14 detects that the opening-closing state of the battery lid 12 is a closing state, the control unit 20 operates the system control unit 50 in the normal mode. If the opening-closing state detection unit 14 detects that the opening-closing state of the battery lid 12 is an opening state, the control unit 20 temporarily operates the system control unit 50 in the normal mode to check an abnormal current, and then operates it in the sleep mode. This makes it possible to suppress the consumption of the power supply (battery drain) by the power supply control system 1 while the battery lid 12 is open, and detect an abnormal current. It is therefore possible to suppress the consumption of the power supply due to the flow of an abnormal current. However, if the system control unit 50 is operated, and the detection result obtained by the current detection circuit 52 reveals that an abnormal current is flowing, (a control signal from) the control circuit 54 turns off the first switch circuit 30. In other words, if the magnitude of the current flowing into the first switch circuit 30 is equal to or larger than the threshold, the first switch circuit 30 is turned off to set the power supply line which connects the first switch circuit 30 and the power supply circuit 60 to a non-connected state.

If the detection result obtained by the current detection circuit 52 reveals that the magnitude of the current flowing into the first switch circuit 30 is smaller than the threshold, (a control signal from) the control unit 20 turns on the second switch circuit 80. Then, (the control signal from) the control unit 20 also operates the power supply circuit 60, and a DC voltage output from the power supply unit 10 is supplied to the power supply circuit 60 by bypassing the current limiting resistance 70 (via the second switch circuit 80). This makes it possible to prevent wasteful power consumption by the current limiting resistance 70 (suppress the consumption of the power supply).

Figure 2:
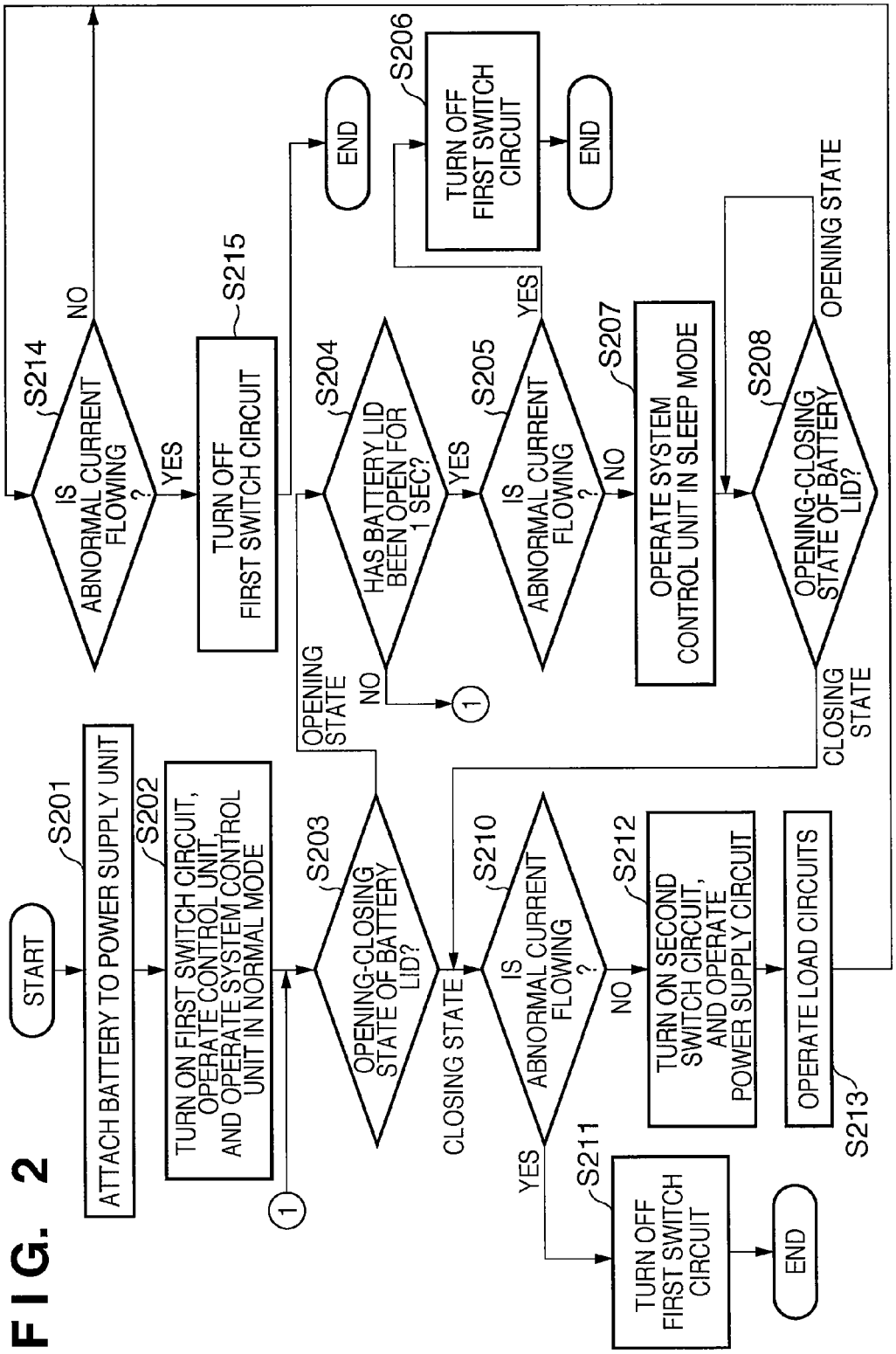
FIG. 2 is a flowchart for explaining the operation of the power supply control system according to one aspect of the present invention.
Figure 3:
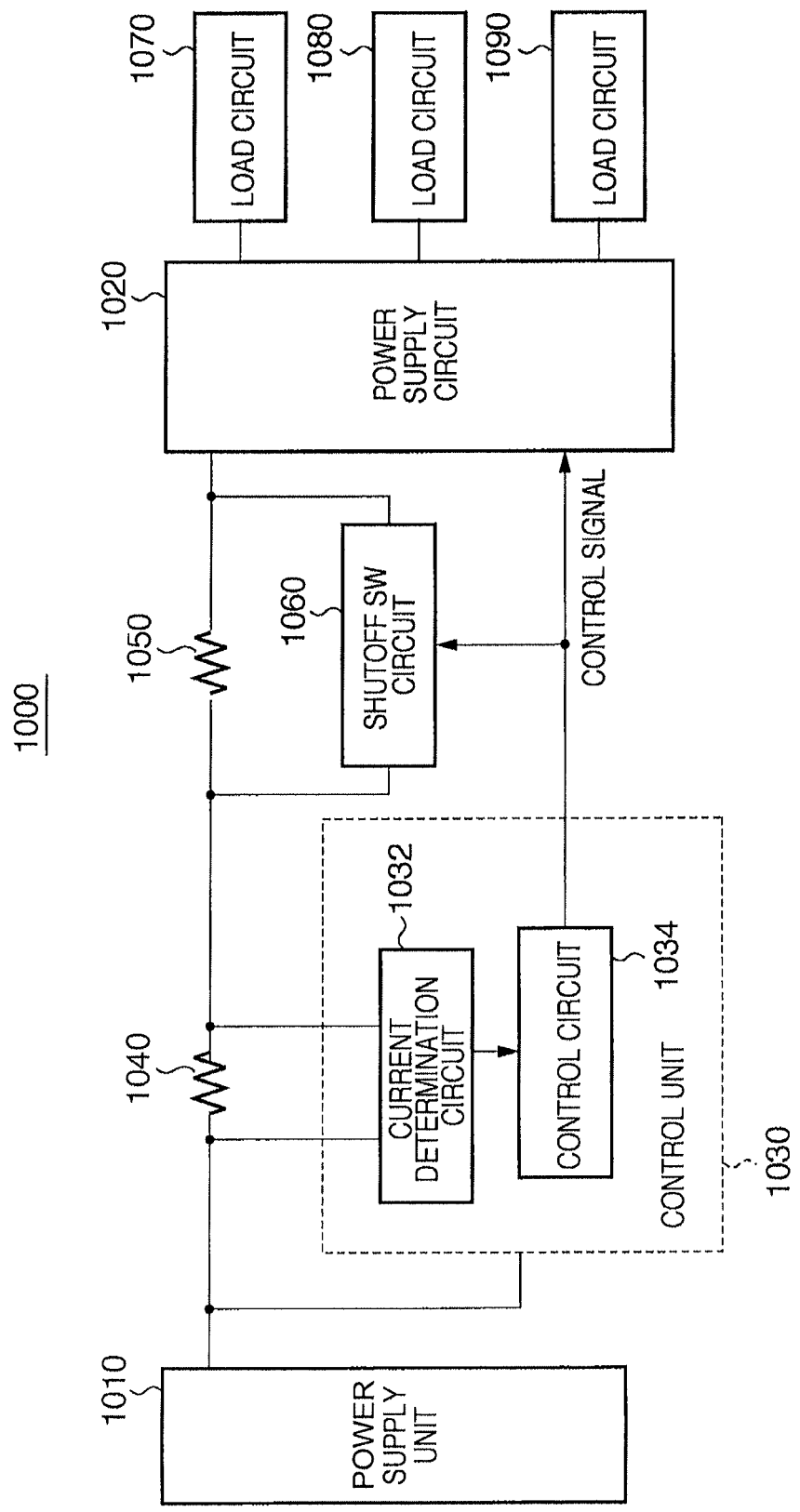
FIG. 3 is a schematic block diagram showing a conventional power supply control system.

The operation of the power supply control system 1 will be explained below with reference to FIG. 2. FIG. 2 is a flowchart for explaining the operation of the power supply control system 1. In this embodiment, the first switch circuit 30 and second switch circuit 80 are OFF until a battery is attached to the power supply unit 10, as described above.

In step S201, a battery is attached to the power supply unit 10. In step S202, the control unit (not shown) turns on the first switch circuit 30. The control unit 20 is also operated to operate the system control unit 50 in the normal mode.

In step S203, the control unit 20 determines the opening-closing state of the battery lid 12. More specifically, the control unit 20 determines whether the opening-closing state of the battery lid 12 is an opening state or closing state, based on a detection signal which represents the opening-closing state of the battery lid 12 and is output from the opening-closing state detection unit 14. If the opening-closing state of the battery lid 12 is determined to be an opening state, the process advances to step S204. If the opening-closing state of the battery lid 12 is determined to be a closing state, the process advances to step S210.

In step S204, it is determined whether the battery lid 12 has been open for 1 sec. If the battery lid 12 has been open for 1 sec, the process advances to step S205. If the battery lid 12 has not been open for 1 sec, the process returns to step S203.

In step S205, the current detection circuit 52 determines whether an abnormal current is flowing through the power supply control system 1. More specifically, if the magnitude of a current flowing into the first switch circuit 30 is equal to or larger than the threshold, the current detection circuit 52 determines that an abnormal current is flowing as, for example, one of the power supply circuit 60 and load circuits $LC_1$, $LC_2$, and $LC_3$ short-circuits. If the magnitude of the current flowing into the first switch circuit 30 is smaller than the threshold, the current detection circuit 52 determines that no abnormal current is flowing. If it is determined that an abnormal current is flowing, the current detection circuit 52 outputs an abnormal current detection signal to the control circuit 54, and the process advances to step S206. If it is determined that no abnormal current is flowing, the process advances to step S207.

In step S206, the control circuit 54 turns off the first switch circuit 30 to end the operation. With this operation, the power supply line which connects the power supply unit 10 and the power supply circuit 60 enters a non-connected state. This makes it possible to prevent the abnormal current from continuing flowing through the power supply control system 1.

In step S207, the control unit 20 operates the system control unit 50 in the sleep mode. In other words, the control unit 20 switches the operation mode of the system control unit 50 from the normal mode to the sleep mode. With this operation, the system control unit 50 operates with a small consumption current. This makes it possible to suppress the consumption of the power supply.

In step S208, the control unit 20 determines the opening-closing state of the battery lid 12, as in step S203. If it is determined that the opening-closing state of the battery lid 12 is an opening state, the process waits until the opening-closing state of the battery lid 12 changes to a closing state. If it is determined that the opening-closing state of the battery lid 12 is a closing state, the process advances to step S210.

In step S210, the current detection circuit 52 determines whether an abnormal current is flowing through the power supply control system 1, as in step S205. If it is determined that an abnormal current is flowing, the current detection circuit 52 outputs an abnormal current detection signal to the control circuit 54, and the process advances to step S211. If it is determined that no abnormal current is flowing, the process advances to step S212.

In step S211, the control circuit 54 turns off the first switch circuit 30 to end the operation. With this operation, the power supply line which connects the power supply unit 10 and the power supply circuit 60 enters a non-connected state. This makes it possible to prevent the abnormal current from continuing flowing through the power supply control system 1.

In step S212, the control unit 20 turns on the second switch circuit 80, and also operates the power supply circuit 60.

As the second switch circuit 80 is turned on and the power supply circuit 60 is operated, the plurality of load circuits $LC_1$, $LC_2$, and $LC_3$ normally operate in step S213. Since the second switch circuit 80 is ON, it is possible to avoid wasteful power consumption by the current limiting resistance 70.

As the system control unit 50 operates in the normal mode, the current detection circuit 52 determines in step S214 whether an abnormal current is flowing through the power supply control system 1. If it is determined that an abnormal current is flowing, the current detection circuit 52 outputs an abnormal current detection signal to the control circuit 54, and the process advances to step S215. If it is determined that no abnormal current is flowing, the process operation in step S214 is repeated to continue the determination as to whether an abnormal current is flowing through the power supply control system 1.

In step S215, the control circuit 54 turns off the first switch circuit 30 to end the operation. With this operation, the power supply line which connects the power supply unit 10 and the power supply circuit 60 enters a non-connected state. This makes it possible to prevent the abnormal current from continuing flowing through the power supply control system 1.

As described above, the power supply control system 1 according to this embodiment can suppress the consumption of the power supply (battery) due to the flow of an abnormal current and by the power supply control system itself by controlling the operation of the power supply control system in accordance with the opening-closing state of the battery lid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-210298 filed on Aug. 10, 2007, which is hereby incorporated by reference herein in its entirety.

What is claimed is:

1. A power supply control system, comprising:
   a power supply unit that includes a detachable battery;
   a power supply circuit that supplies DC voltage to a load;
   a first switch circuit that is connected in series between the power supply unit and the power supply circuit;
   a first control unit that operates in one of a first mode and a second mode in which a consumption current is smaller than in the first mode, wherein the first control unit can determine whether or not a current flowing into the first switch circuit is abnormal if the first control unit is operated in the first mode, and the first control unit turns off the first switch circuit if the first control unit determines that the current flowing into the first switch circuit is abnormal;
   an opening-closing state detection unit that detects whether a battery lid is one of an opening state and a closing state, wherein the battery lid is provided to the power supply unit; and
   a second control unit that controls the first control unit to cause the first control unit to operate in one of the first mode and the second mode, wherein if the opening-closing state detection unit detects that the battery lid is in the opening state, the second control unit causes the first control unit to operate in the first mode before the second control unit causes the first control unit to operate in the second mode so that the first control unit can determine whether or not the current flowing into the first switch circuit is abnormal.

2. The power supply control system according to claim 1, further comprising:
   a timer circuit that measures a time elapsed since the opening-closing state detection unit detects that the battery lid is in the opening state,
   wherein the second control unit causes the first control unit to operate in the first mode if the timer circuit measures a predetermined time.

3. The power supply control system according to claim 1, further comprising:
   a current limiting unit that is connected between the first switch circuit and the power supply circuit, and limits a current flowing between the first switch circuit and the power supply circuit; and
   a second switch circuit that is connected in parallel with the current limiting unit,
   wherein the second control unit turns on the second switch circuit if the battery lid is in the closing state and the first control unit determines that the current flowing into the first switch circuit is not abnormal.

4. The power supply control system according to claim 3, wherein the first control unit turns off the first switch circuit if the battery lid is in the closing state, the first switch circuit and the second switch circuit are turned on, and the first control unit determines that the current flowing into the first switch circuit is abnormal.

5. An electronic apparatus, comprising:
   a power supply circuit that supplies DC voltage to a load;
   a first switch circuit that is connected in series between a power supply unit and the power supply circuit, wherein the power supply unit includes a detachable battery;
   a first control unit that operates in one of a first mode and a second mode in which a consumption current is smaller than in the first mode, wherein the first control unit can determine whether or not a current flowing into the first switch circuit is abnormal if the first control unit is operated in the first mode, and the first control unit turns off the first switch circuit if the first control unit determines that the current flowing into the first switch circuit is abnormal;
   an opening-closing state detection unit that detects whether a battery lid is one of an opening state and a closing state, wherein the battery lid is provided to the power supply unit; and
   a second control unit that controls the first control unit to cause the first control unit to operate in one of the first mode and the second mode, wherein if the opening-closing state detection unit detects that the battery lid is in the opening state, the second control unit causes the first control unit to operate in the first mode before the second control unit causes the first control unit to operate in the second mode so that the first control unit can determine whether or not the current flowing into the first switch circuit is abnormal.

6. The electronic apparatus according to claim 5, further comprising:
   a timer circuit that measures a time elapsed since the opening-closing state detection unit detects that the battery lid is in the opening state,
   wherein the second control unit causes the first control unit to operate in the first mode if the timer circuit measures a predetermined time.

7. The electronic apparatus according to claim 5, further comprising:
   a current limiting unit that is connected between the first switch circuit and the power supply circuit, and limits a current flowing between the first switch circuit and the power supply circuit; and
   a second switch circuit that is connected in parallel with the current limiting unit,
   wherein the second control unit turns on the second switch circuit if the battery lid is in the closing state and the first control unit determines that the current flowing into the first switch circuit is not abnormal.

8. The electronic apparatus according to claim 7, wherein the first control unit turns off the first switch circuit if the battery lid is in the closing state, the first switch circuit and the second switch circuit are turned on, and the first control unit determines that the current flowing into the first switch circuit is abnormal.

* * * * *